Patented Dec. 24, 1929

1,740,854

UNITED STATES PATENT OFFICE

WILLIAM GUMP, OF NEWARK, NEW JERSEY, ASSIGNOR OF FORTY PER CENT TO JOHN C. DEHLS AND FORTY PER CENT TO LEO STEIN

CELLULOSE-ACETATE COMPOSITION

No Drawing.   Application filed September 30, 1927.   Serial No. 223,244.

This invention relates to improvements in cellulose acetate compositions made with new and useful plasticizers, and to the process of producing such compositions.

The various cellulose-acetate compositions to which the present invention relates are employed in the arts, generally as imitations of natural substances, sometimes in their original finished form with or without incorporated colors or other inert substances and sometimes in films which are used for photographic and other purposes.

It is well known that molded objects, sheets or films, varnishes and filaments, made from a cellulose acetate solution show brittleness after evaporation of the used solvent. Therefore, other chemical substances of a low volatility, i. e., plasticizers, must be added to the mixture of cellulose acetate and solvent to render the final product tough and flexible and, for certain purposes, substantially non-inflammable. All these plasticizers are comparatively expensive.

In the course of my experiments, I have discovered that substances in the class containing 4-oxy-1-tertiary butyl-benzene and its nucleus-halogenated derivatives, in conjunction with a proper solvent, such as acetone or mixtures of halogenated aliphatic hydrocarbons with aliphatic alcohols, will convert that variety of cellulose acetate which is soluble in acetone into a plastic mass or compound capable of being worked into molded objects, sheets or films, varnishes and filaments by those skilled in the art. These products have great flexibility and do not become brittle nor deteriorate upon aging or by heating to as high as 140° C. A cellulose acetate composition containing 4-oxy-1-tertiary butyl-benzene as a plasticizer is superior in stability, flexibility, tensile strength and elasticity and can be produced at a lower cost than by employing the present known plasticizers.

4-oxy-1-tertiary butyl-benzene is a white, crystallized solid, melting at 98° C., and boiling at 236–238° C., and has the formula:

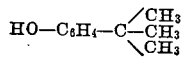

This substance can easily be obtained by reaction of phenol with tertiary butylchloride in presence of a catalyst. As tertiary butylchloride or tertiary butanol are now available in large quantities as by-products in certain types of cracking processes of petroleum, 4-oxy-1-tertiary butyl-benzene can be produced at a lower price than any plasticizer at present used for cellulose acetate compounds.

Nucleus-halogenated derivatives of 4-oxy-1-tertiary butyl-benzene, such as 3-bromine-4-oxy-1-tertiary butyl-benzene (M. P. 50° C.) or 3.5-di-bromine-4-oxy-1-tertiary butyl-benzene (M. P. 78° C.) may also be used as plasticizers for certain purposes where substantially non-inflammable cellulose acetate plastic compounds are desired.

I have further found that phosphates of the class containing triphenylphosphate or tricresylphosphate or a similar substance may be added in any proportion to the new plasticizers named above without interfering with the solvent action of 4-oxy-1-tertiary butyl-benzene or of its nucleus-halogenated derivatives. The addition of the phosphates serves to render the resulting product substantially non-inflammable. Other plasticizers, being used for cellulose acetate compounds, such as ethyl-acelanilide, ethyl-p-toluolsulfamide, di-ethyl-di-phenyl-urea and similar substances, may be added to the new plasticizers in any desired proportion.

Following is an example of the manner in which the invention may be practiced:—I dissolve from 20 to 40 parts of 4-oxy-1-tertiary butyl-benzene and 1 part of urea in 600 parts of acetone or in the same amount of another solvent common to both the plasticizer and cellulose acetate. I then add 100 parts of cellulose acetate of the acetone soluble variety. Or I dissolve 10 to 20 parts of 4-oxy-1-tertiary butyl-benzene, 10 to 20 parts of triphenylphosphate and 1 part of urea in 600 parts of acetone or in the same quantity of another solvent common to both the plasticizer and cellulose acetate. I then add 100 parts of cellulose acetate. I allow the mass to soak or macerate at room temperature in a closed vessel until gelatinization has taken place. The compound may then be worked in the usual manner well known to those skilled in the art.

It will be understood, of course, by those skilled in the art that the precise proportions given above of the ingredients specified are not essential, and that I do not limit myself to the proportions specified. It will also be understood that coloring matters and other inert substances may be incorporated, if desired.

What I claim is:—

1. A cellulose acetate plastic containing as a plasticizer a substance of the class which includes 4-oxy-1-tertiary butyl-benzene and its nucleus-halogenated derivatives.

2. A cellulose acetate plastic containing 4-oxy-1-tertiary butyl-benzene as a plasticizer.

3. A cellulose acetate plastic containing a nucleus-halogenated derivative of 4-oxy-1-tertiary butyl-benzene as a plasticizer.

4. A cellulose acetate plastic containing a mixture of 4-oxy-1-tertiary butyl-benzene and of a nucleus-halogenated derivative thereof as a plasticizer.

5. A cellulose acetate plastic containing as a plasticizer a mixture of a substance of the class which includes 4-oxy-1-tertiary butyl-benzene and its nucleus-halogenated derivatives, with a phosphate of the class which includes triphenylphosphate and tricresylphosphate.

6. A composition of matter comprising cellulose acetate, a plasticizer of the class including 4-oxy-1-tertiary butyl-benzene and its nucleus-halogenated derivatives, and a solvent common to both the cellulose acetate and the plasticizer.

In testimony whereof I have affixed my signature.

WILLIAM GUMP.